United States Patent [19]
Hamilton

[11] Patent Number: 5,188,089
[45] Date of Patent: Feb. 23, 1993

[54] BARBECUE GRILL SUPPORT

[75] Inventor: James J. Hamilton, Arcanum, Ohio

[73] Assignee: J. J. Hamilton Enterprises, Inc., Arcanum, Ohio

[21] Appl. No.: 720,267

[22] Filed: Jun. 24, 1991

[51] Int. Cl.⁵ .......................... A47J 37/07; F24C 1/16
[52] U.S. Cl. ............................ 126/30; 99/449; 99/450; 108/134; 126/25 R; 126/9 R; 211/198
[58] Field of Search .............. 99/449, 482, 450; 126/25 R, 9 R, 9 B, 30; 211/195, 198, 149, 132; 108/134, 44

[56] References Cited

U.S. PATENT DOCUMENTS

| | | | |
|---|---|---|---|
| 1,095,970 | 5/1914 | Stopple | 99/449 |
| 2,360,026 | 10/1944 | Wall | 99/449 |
| 2,503,602 | 4/1950 | Titley | 108/134 |
| 2,503,795 | 4/1950 | Brown | 99/449 X |
| 2,774,640 | 12/1956 | Harmon et al. | 108/134 |
| 2,867,471 | 7/1955 | Coon, Jr. | 296/23 |
| 2,912,972 | 11/1957 | Leyen | 126/25 |
| 3,249,232 | 5/1966 | Pokorski | 211/198 |
| 3,433,443 | 3/1969 | Mangan et al. | 211/149 |
| 3,465,893 | 9/1969 | Kinney | 211/149 |
| 3,815,571 | 6/1974 | Heffelfinger | 126/25 R |
| 4,338,912 | 7/1982 | Gaskins | 126/9 R |
| 4,347,830 | 3/1982 | Runyan | 126/9 R |
| 4,393,857 | 7/1983 | Sanford | 126/30 |

FOREIGN PATENT DOCUMENTS 617995 2/1949 United Kingdom .............. 108/134

Primary Examiner—Timothy F. Simone
Attorney, Agent, or Firm—Biebel & French

[57] ABSTRACT

A grill support is disclosed for supporting a barbecue grill in locations where a table is not available. The grill support may be attached to a ladder or to a balcony rail or similar support structure and includes a support platform supported in cantilevered manner spaced outwardly from the support structure. In addition an adjustment mechanism is provided whereby the support platform may be moved to a level position regardless of variations in orientation of the support structure.

14 Claims, 2 Drawing Sheets

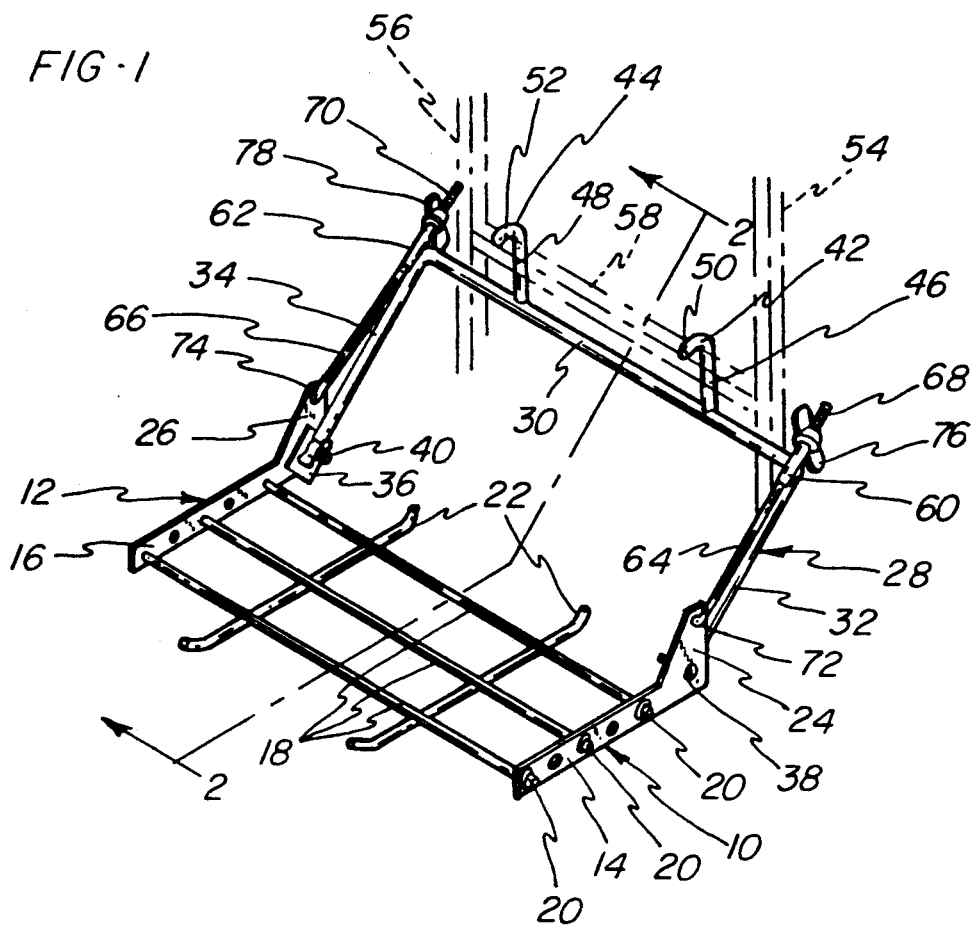
FIG·1
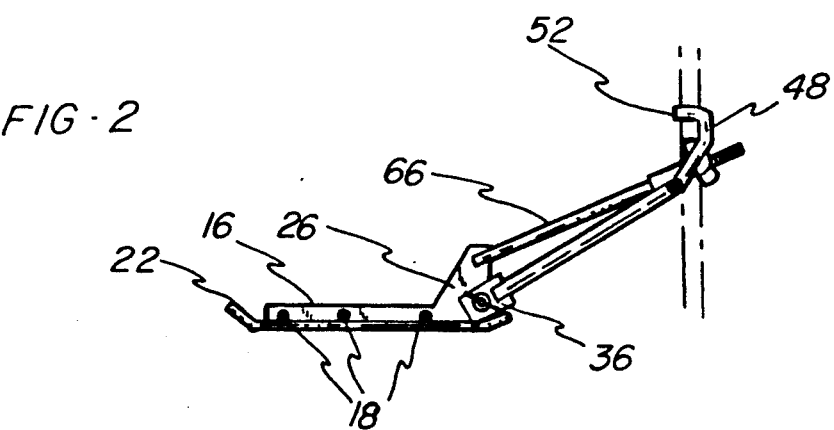
FIG·2

BARBECUE GRILL SUPPORT

BACKGROUND OF THE INVENTION

The present invention relates to a barbecue grill support structure and, more particularly, to a grill support structure which may be suspended from a ladder, balcony and boating railings and similar structures.

During outings, such as tailgate parties, camping or picnicking, it is often desirable to have a barbecue grill for preparing food. Such a grill is typically of compact and lightweight construction in order to permit it to be transported easily to the location of the picnic or outing. One problem which commonly arises is providing a proper support surface for the grill when the grill is in use, and this is particularly a problem if the location of the outing does not provide picnic tables or other means for supporting the grill.

U.S. Pat. No. 2,912,972 to Leyen discloses a portable picnic grill which is designed to be supported at the edge of a picnic table. As may be seen, the grill is provided with a clamp whereby the grill may be attached directly to the edge of the table surface and thereby supported in cantilevered manner from the table. This particular construction requires that a table surface be available for supporting the grill and thus is restricted as to the areas in which the grill may be used.

U.S. Pat. No. 4,347,830 to Runyan discloses a collapsible outdoor cooking apparatus which may be stored within the tire rim of an automotive spare tire mounted vertically to a vehicle. This device is supported in cantilevered manner by a mounting plate which may be either bolted to the hub portion of a spare tire rim or clamped to the edge of a table. In addition, an adjusting nut is provided whereby the horizontal position of the cooking apparatus may be adjusted. While this device may be conveniently used with a vehicle having a vertically mounted spare tire, it is restricted in its use in that it may be only used with a wheeled vehicle and, if it used in combination with the edge of a table, it must be provided with a separate bracket or clamp than that used to mount it to a vehicle.

Accordingly, there is a need for a grill support which is adapted to be mounted in a variety of locations and which will support the grill at a convenient level for use. In addition, there is a need for a grill support which does not require the use of a picnic table and which may be quickly mounted to a supporting member on a vehicle without the use of bolts or other fasteners. Further, there is a need for such a grill support which is of light construction and which will fold up easily into a compact configuration for easy storage.

SUMMARY OF THE INVENTION

The present invention provides a grill support which may be attached to motorhome ladders, van ladders, safety rails on pontoon boats, or to a patio rail. The grill support is designed to support the grill at a convenient cooking level, and attaches to a ladder or railing without the use of tools and eliminates the need for a table for providing support.

The grill support includes a support platform having a planar support section in the form of a metal grid for engaging the lower surface of a grill. Elongated cantilever legs extend from a horizontal bar to engage the support platform at a pivot connection whereby the support platform may pivot relative to the cantilever legs.

Tensile adjustment bars also extend from the horizontal bar and attach to the support platform at a location spaced from and above the pivot connection between the support member and the cantilever legs. The adjustment bars are also pivotally connected to the support platform and carry a tensile force which resists the tendency of the support platform to pivot relative to the cantilever legs. In addition, the length of the tensile means, as measured between the horizontal bar and the support platform, may be varied to level the planar support section for supporting the grill.

A pair of J-shaped hook members are immovably attached to the horizontal bar for engaging around the bottom and back and a portion of the top sides of a ladder rung while the horizontal bar engages the vertical runners of the ladder whereby the grill support may be mounted to a ladder and extend therefrom in cantilevered manner.

Other objects and advantages of the invention will be apparent from the following description, the accompanying drawings and the appended claims.

BRIEF DESCRIPTION OF THE DRAWINGS

FIG. 1 is a perspective view of the grill support of the present invention;

FIG. 2 is a cross-sectional view taken along line 2—2 in FIG. 2; and

DETAILED DESCRIPTION OF THE PREFERRED EMBODIMENT

Figure 3:
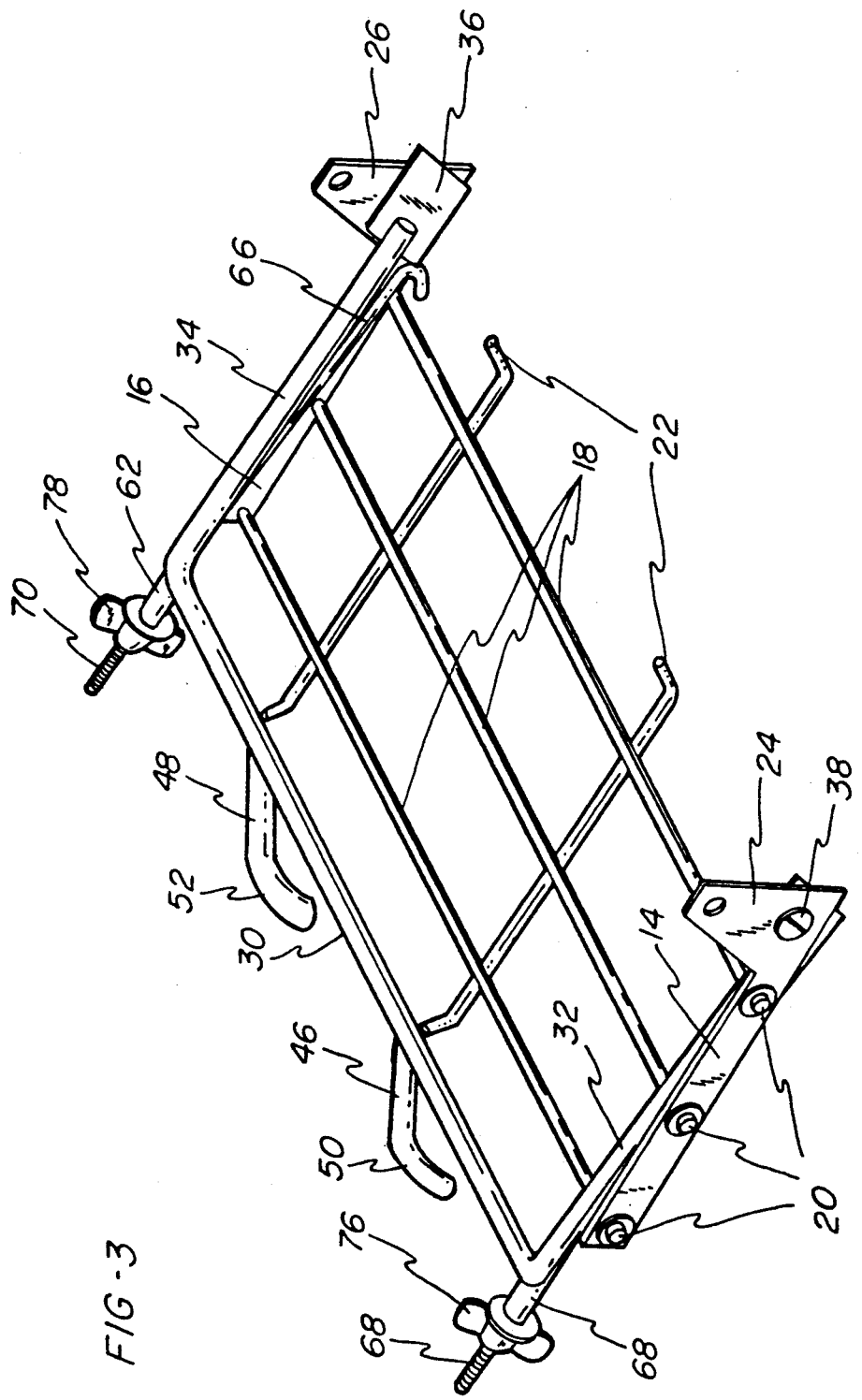
FIG. 3 is a perspective view showing the grill support folded for storage.

Referring to FIG. 1, the grill support of the present invention includes a pair of substantially planar elongated support arms 10, 12. The support arms 10, 12 lie in vertical planes and extend substantially parallel to each other.

Each of the arms 10, 12 includes a substantially horizontal base extension 14, 16 having means defining a plurality of aligned apertures therein through which a plurality of elongated support bars 18 extend. The support bars 18 lie in a substantially horizontal plane and include end portions carrying cap members 20 for preventing the support arms 10, 12 from slipping off the end of the bars 18.

A plurality of tie bars 22 are attached to a lower surface of the support bars 18 and extend substantially parallel to the plane containing the support bars 18. Thus, the support bars 18 and tie bars 22 define a grid or planar support section for engaging a lower surface of a grill. It should be noted that the end portions of the tie bars 22 are preferably turned up slightly to prevent a grill from sliding forwardly or rearwardly off of the planar support section.

The support arms 10, 12 are also each provided with a pivot extension section 24, 26 extending in a direction substantially orthogonal to the direction of extension of the base extensions 14, 16. The pivot extensions 24, 26 are located at a rear portion of the support arms 10, 12 and the support arms 10, 12 are attached to a cantilever bar 28 at points adjacent to the junctions between the horizontal base extensions 14, 16 and the pivot extensions 24, 26.

The cantilever bar 28 includes a horizontal cantilever base 30 having opposing ends and parallel first and second legs 32, 34, respectively, extending from the cantilever base ends to form a U-shaped structure. The cantilever base 30 and first and second legs 32, 34 are preferably formed integrally with each other from a single piece of tubing which is bent into the U-shaped configuration.

A plate 36 may be attached to the ends of each of the legs 32, 34 at the end thereof distal from the cantilever bar 30, and first and second pivot fasteners 38, 40 are provided extending through the support arms 10, 12 adjacent to the junction between the base extensions 14, 16 and the pivot extensions 24, 26 and pass through the plates 36 at the ends of the legs 32, 34. In the preferred embodiment the fasteners are in the form of a bolt having a wing nut to hold the bolt in place and the fasteners 38, 40 form a pivot connection whereby the support arms 10, 12 may pivot relative to the legs 32, 34.

A pair of hook members 42, 44 are immovably attached to the cantilever base 30 inwardly from the cantilever base ends and each hook 42, 44 includes a respective elongated portion 46, 48 extending from the cantilever base 30 at an obtuse angle relative to the first and second legs 32, 34. In addition, each hook member 42, 44 includes an angled portion 50, 52 wherein the elongated portions 46, 48 and angle portions 50, 52 define a J-shaped configuration for each of the hook members 42, 44.

The hook members 42, 44 are particularly shaped and positioned on the cantilever bar 28 to permit the cantilever base 30 to engage a pair of vertical runners 54, 56 for a ladder or balcony rail while the elongated portions 46, 48 of the hook members 42, 44 extend under a horizontal ladder rung or top rail 58 for a balcony and the angled portions 50, 52 extend around the back and over the top portion of the element 58. In this manner, the legs 32, 34 are caused to extend outwardly from the vertical members 54, 56 of the balcony and the hook members 42, 44 prevent the legs 32, 34 from pivoting about the cantilever base 30 when a downward force is applied to the legs 32, 34.

The grill support further includes first and second elongated hollow collars 60, 62 attached to the cantilever bar 28 adjacent to the junction between the legs 32, 34 and the cantilever base 30. A pair of adjustment rods 64, 66 is further provided with an end 68, 70 of each of the rods being threaded and passing through a respective collar 60, 62. An opposite end 72, 74 of each of the rods 64, 66 is bent to curve back toward the threaded ends 68, 70 and each of the bent ends 72, 74 passes through an aperture 71, 73 (see FIG. 3) in the pivot extensions 24, 26 distal from the pivot fasteners 38, 40.

A pair of wing nuts 76, 78 is threadably engaged with the threaded ends 68, 70 and contacts an end of each of the collars 60, 62 distal from the bent ends 72, 74. Thus, by rotating the wing nuts 76, 78, the attachment point between the bent ends 72, 74 and the pivot extensions 24, 26 may be drawn closer to or moved away from the attachment point formed between the collars 60, 62 and the wing nuts 76, 78 for the opposing ends of the adjustment rods 64, 66.

It should be apparent that the adjustment rods 64, 66 form tensile members which have a tensile force applied to them through the pivot extensions 24, 26 as a grill or any other weight placed on the support section tends to pivot the support section about the pivot fasteners 38, 40. In addition, the support section of the grill support may be leveled by rotating the wing nuts 76, 78 to pivot the front portion of the planar support section either up or down relative to the fasteners 38, 40.

It should therefore be apparent that the present grill support may be used in combination with any support structure having a vertically oriented support member and a horizontal support member extending from the vertical support member such that the hook members 42, 44 may be engaged with the horizontally oriented support member and the cantilever base 30 may be engaged with the vertically oriented support member whereby the cantilever bar may be suspended in cantilevered relation to the vertical and horizontal support members. Further, it should be apparent that the angle of the base extensions 14, 16 may be adjusted relative to the legs 32, 34 to permit the support section carrying the grill to be positioned level regardless of variations in the orientation of the support structure defined by the vertical and horizontal support members.

Further, as may be seen in FIG. 3, the end portions 72, 74 of the adjustment rods 64, 66 may be disengaged from respective apertures 71, 73 in the pivot extensions 24, 26 whereby the cantilever bar 28 and adjustment rods 64, 66 may be pivoted about the pivot fasteners 38, 40 into a position with the legs 32, 34 substantially parallel to the base extensions 14, 16 to provide a doubled over compact structure of the grill support which may be easily stored.

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. A barbecue grill support structure comprising:
   a support platform having a planar support section for engaging a lower surface of a grill, said platform having a front portion and a rear portion;
   elongated cantilever means having a first end for attachment to a support member and a second end supported in cantilever relationship to said first end;
   pivot means connecting said second end to said rear portion whereby said front portion may pivot relative to said cantilever means about said pivot means;
   tensile means attached to said support platform at a first attachment point in spaced relationship to said pivot means and attached to said cantilever means at a second attachment point adjacent to said first end of said cantilever means, said support platform applying a tensile force to said tensile means when a downward force is applied to said front portion of said platform;
   adjustment means formed on said tensile means for varying the distance between said first and second attachment points whereby the angle between said support platform and said cantilever means may be varied; and
   wherein said support platform includes a pivot lever portion extending from said rear portion in substantially orthogonal relationship to said planar support section, said first attachment point for said tensile means being located on said pivot lever portion.

2. The grill support of claim 1 wherein said elongated cantilever means includes a bar extending in a direction perpendicular to a line extending from said front to said rear portion of said platform and further including an angled member immovably attached to said bar for releasably engaging a horizontally oriented ladder rung.

3. The grill support of claim 2 wherein said angled member is substantially J-shaped.

4. The grill support of claim 1 wherein said first attachment point includes means defining an aperture in said support platform and said tensile means includes a rod member having a curved end passing through said aperture.

5. The grill support of claim 4 wherein said rod member includes a threaded end at said second attachment point opposite from said curved end and a nut member threadably engaged with said threaded end.

6. The grill support of claim 1 wherein said tensile means may be disengaged from said support platform at said first attachment point to enable said elongated cantilever means and said support platform to pivot toward each other about said pivot means into a doubled over configuration.

7. The grill support of claim 1 wherein said tensile means and said support platform may pivot relative to each other about an axis of rotation at said first attachment point.

8. The grill support of claim 7 wherein said axis of rotation is parallel to a rotational axis defined by said pivot means.

9. The grill support of claim 1 wherein said elongated cantilever means includes a horizontal bar and a pair of legs extending from said bar to attach to said support platform at said pivot means.

10. The grill support of claim 9 wherein said tensile means includes a pair of rods extending from said bar at said second attachment point and attaching to said support platform at said first attachment point.

11. The grill support of claim 10 wherein said first attachment point is located above said pivot means.

12. A barbecue grill support structure comprising:
a pair of planar elongated support arms extending substantially parallel to each other, each of said arms including a substantially horizontal base extension having means defining a plurality of aligned apertures therein and a pivot extension extending vertically from an end of said base extension;
a plurality of elongated support bars extending horizontally between said support arms and including end portions passing through said plurality of aligned apertures, said support arms acting to support said support bars;
a plurality of tie bars attached to said support bars and extending substantially parallel to said support arms;
a cantilever bar including a horizontal cantilever base having opposing ends and parallel first and second legs extending from said cantilever base ends to form a U-shaped structure;
a pair of hook members attached to said cantilever base inwardly from said cantilever base ends, each hook member including a first elongated portion extending from said cantilever base at an obtuse angle relative to said first and second legs and an end portion curved back toward said legs;
first and second pivot fasteners extending through said support arms adjacent to said pivot extensions, said pivot fasteners further passing through an end of a respective of one of said first and second legs distal from said cantilever base to form a pivot connection between said first and second legs and said support arms;
first and second elongated collars attached to said cantilever bar at the junction between said legs and said cantilever base;
adjustment rods having opposing first and second ends, said first end of each said rods being threaded and passing through one of said elongated collars, said second end having a bent portion curving back toward said first end;
means defining an aperture in each of said pivot extensions distal from said pivot fastener, each of said second rod ends passing through said aperture in one of said pivot extensions;
nut means threadably engaged with said first ends of said rods for engaging an end of said collars to retain said rods within said collars; and
wherein said cantilever base may be engaged with a vertically oriented support member and said hook members may be engaged with a horizontally oriented support member to suspend said cantilever bar in cantilevered relation to said vertical and horizontal support members and the angle of said base extensions relative to said legs may be adjusted by rotating said nut means about said rods whereby said base extensions are caused to pivot about said pivot fasteners.

13. A barbecue grill support structure comprising:
a support platform having a planar support section for engaging a lower surface of a grill, said platform having a front portion and a rear portion;
elongated cantilever means having a first end for attachment to a support member and a second end supported in cantilever relationship to said first end;
pivot means connecting said second end to said rear portion whereby said front portion may pivot relative to said cantilever means about said pivot means;
tensile means attached to said support platform at a first attachment point in spaced relationship to said pivot means and attached to said cantilever means at a second attachment point adjacent to said first end of said cantilever means, said support platform applying a tensile force to said tensile means when a downward force is applied to said front portion of said platform;
adjustment means formed on said tensile means for varying the distance between said first and second attachment points whereby the angle between said support platform and said cantilever means may be varied; and
wherein said first attachment point includes means defining an aperture in said support platform and said tensile means includes a rod member having a curved end passing through said aperture.

14. A barbecue grill support structure comprising:
a support platform having a planar support section for engaging a lower surface of a grill, said platform having a front portion and a rear portion;
elongated cantilever means having a first end for attachment to a support member and a second end supported in cantilever relationship to said first end;
pivot means connecting said second end to said rear portion whereby said front portion may pivot relative to said cantilever means about said pivot means;
tensile means attached to said support platform at a first attachment point in spaced relationship to said pivot means and attached to said cantilever means at a second attachment point adjacent to said first end of said cantilever means, said support platform applying a tensile force to said tensile means when a downward force is applied to said front portion of said platform;

adjustment means formed on said tensile means for varying the distance between said first and second attachment points whereby the angle between said support platform and said cantilever means may be varied; and wherein said elongated cantilever means includes a horizontal bar and a pair of leges extending from said bar to attach to said support platform at said pivot means;

said cantilever means further including an angled member immovably attached to said bar for releasably engaging a horizontally oriented ladder rung.

* * * * *